US012598655B2

(12) United States Patent
Kim et al.

(10) Patent No.: US 12,598,655 B2
(45) Date of Patent: Apr. 7, 2026

(54) METHOD AND APPARATUS FOR MANAGING SESSION BY CONSIDERING BACKHAUL INFORMATION IN WIRELESS COMMUNICATION SYSTEM

(71) Applicant: Samsung Electronics Co., Ltd., Gyeonggi-do (KR)

(72) Inventors: Dongyeon Kim, Gyeonggi-do (KR); Dongeun Suh, Gyeonggi-do (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 580 days.

(21) Appl. No.: 17/926,893

(22) PCT Filed: May 21, 2021

(86) PCT No.: PCT/KR2021/006317

§ 371 (c)(1),
(2) Date: Nov. 21, 2022

(87) PCT Pub. No.: WO2021/235879

PCT Pub. Date: Nov. 25, 2021

(65) Prior Publication Data

US 2023/0292380 A1     Sep. 14, 2023

(30) Foreign Application Priority Data

May 21, 2020    (KR) ........................ 10-2020-0060966
Feb. 3, 2021    (KR) ........................ 10-2021-0015379

(51) Int. Cl.
*H04W 76/12*         (2018.01)
*H04B 7/185*         (2006.01)
(52) U.S. Cl.
CPC .......... *H04W 76/12* (2018.02); *H04B 7/1851* (2013.01)

(58) Field of Classification Search
CPC .. H04B 7/1851; H04B 7/18526; H04W 76/12
See application file for complete search history.

(56) References Cited

U.S. PATENT DOCUMENTS 5,991,596 A * 11/1999 Cunningham ..... H04B 7/18584
455/12.1
11,290,178 B2 * 3/2022 Cooke ................. H04W 36/144
(Continued)

FOREIGN PATENT DOCUMENTS

CN         108882364         11/2018
EP         3 462 770         4/2019
(Continued)

OTHER PUBLICATIONS

PCT/ISA/210 Search Report issued on PCT/KR2021/006317, Aug. 31, 2021 pp. 5.
(Continued)

*Primary Examiner* — Douglas B Blair
(74) *Attorney, Agent, or Firm* — The Farrell Law Firm, P.C.

(57)         ABSTRACT

The present disclosure relates to a pre-5th-Generation (5G) or 5G communication system to be provided for supporting higher data rates Beyond 4th-Generation (4G) communication system such as Long Term Evolution (LTE). A method by which an access network (AN) node of a wireless communication system manages a session by using backhaul information, according to one embodiment of the present disclosure, may comprise the steps of: selecting an access and mobility management function (AMF) when a registration request message is received from a user equipment (UE); selecting one transport network layer association (TNLA) from among candidate TNLAs for the selected AMF by considering the type of backhaul network of a control plane; transmitting an initial UE message to the selected AMF by using the selected TNLA; and performing
(Continued)

Example of backhaul characteristic based Registration procedure a registration procedure of the UE when a selected TNLA response signal is received from the selected AMF, wherein the candidate TNLA can include a low earth orbit (LEO) and/or a geosynchronous earth orbit (GEP).

15 Claims, 13 Drawing Sheets

(56) References Cited

U.S. PATENT DOCUMENTS

| | | | | |
|---|---|---|---|---|
| 11,546,793 | B2 * | 1/2023 | Chunduri | ............ H04L 41/5019 |
| 2019/0053308 | A1 | 2/2019 | Castellanos Zamora et al. | |
| 2019/0082481 | A1 * | 3/2019 | Ravishankar | ......... H04W 76/10 |
| 2019/0191467 | A1 * | 6/2019 | Dao | ...................... H04W 76/11 |
| 2020/0007226 | A1 * | 1/2020 | Takagi | .................. H04L 67/289 |
| 2020/0029322 | A1 | 1/2020 | Yu et al. | |
| 2020/0228968 | A1 | 7/2020 | Bernardos et al. | |
| 2020/0367127 | A1 | 11/2020 | Zhou et al. | |
| 2020/0396000 | A1 * | 12/2020 | Ryu | ...................... H04W 76/25 |
| 2021/0037496 | A1 * | 2/2021 | Ryu | .................. H04B 7/18504 |
| 2021/0051444 | A1 * | 2/2021 | Ryu | ........................ G01S 19/47 |
| 2021/0076444 | A1 * | 3/2021 | Shu | ...................... H04W 76/25 |
| 2021/0385744 | A1 * | 12/2021 | Wu | ....................... H04W 76/12 |
| 2022/0141891 | A1 * | 5/2022 | Masini | ............... H04B 7/18528 |
| | | | | 370/316 |
| 2023/0232234 | A1 * | 7/2023 | Sébire | .................. H04L 63/123 |
| | | | | 455/410 |
| 2023/0308955 | A1 * | 9/2023 | Fu | ......................... H04W 28/24 |
| 2023/0353238 | A1 * | 11/2023 | Li | ......................... H04W 48/16 |
| 2024/0224256 | A1 * | 7/2024 | Kim | ...................... H04W 48/18 |

FOREIGN PATENT DOCUMENTS

| | | | | |
|---|---|---|---|---|
| KR | 10-2019-0117747 | | 10/2019 | |
| KR | 10-2020-0052266 | | 5/2020 | |
| KR | 10-2021-0055628 | | 5/2021 | |
| WO | WO 2018/085784 | | 5/2018 | |
| WO | WO 2019/096290 | | 5/2019 | |
| WO | WO-2020014337 | A1 * | 1/2020 | ......... H04L 41/0806 |

OTHER PUBLICATIONS

PCT/ISA/237 Written Opinion issued on PCT/KR2021/006317, Aug. 31, 2021, pp. 4.

3GPP TS 23.501 V16.4.0 Technical Specification 3rd Generation Partnership Project; Technical Specification Group Services and System Aspects; System architecture for the 5G System (5GS); Stage 2 (Release 16), Mar. 27, 2020, pp. 432.
3GPP TR 22.822 V16.0.0 Technical Report 3rd Generation Partnership Project; Technical Specification Group Services and System Aspects; Study on using Satellite Access in 5G; Stage 1 (Release 16), Jul. 6, 2018, pp. 35.
3GPP TS 22.261 V17.2.0 Technical Specification 3rd Generation Partnership Project; Technical Specification Group Services and System Aspects; Service requirements for the 5G system; Stage 1 (Release 17), Mar. 27, 2020, pp. 83.
3GPP TR 23.737 V17.0.0 Technical Report 3rd Generation Partnership Project; Technical Specification Group Services and System Aspects; Study on architecture aspects for using satellite access in 5G (Release 17), Dec. 22, 2019, pp. 82.
3GPP TS 23.501 V16.5.0 Technical Specification 3rd Generation Partnership Project; Technical Specification Group Services and System Aspects; System architecture for the 5G System (5GS); Stage 2 (Release 16), Jul. 9, 2020, pp. 441.
3GPP TS 23.502 V16.4.0 Technical Specification 3rd Generation Partnership Project; Technical Specification Group Services and System Aspects; Procedures for the 5G System (5GS); Stage 2 (Release 16), Mar. 27, 2020, pp. 582.
3GPP TR 23.737 V0.7.0, 3rd Generation Partnership Project; Technical Specification Group Services and System Aspects; Study on Architecture Aspects for using Satellite Access in 5G (Release 16), May 2019, 46 pages.
TNO, CATT, Airbus DS SLC, SES S.A., "Combined Solution for Key Issue 5", S2-1910791, SA WG2 Meeting #135, Oct. 14-18, 2019, 10 pages.
Thales Alenia Space (TAS), "Satellite and Terrestrial Network for 5G", D4.4 Harmonisation of SATCOM with 5G Control and User Planes, SaT5G (761413), Dec. 2019, 201 pages.
European Search Report dated Aug. 24, 2023 issued in counterpart application No. 21809112.2-1216, 11 pages.
Huawei, HiSilicon, "TS 23.502: Procedure to Support AMF Stickness Removal", S2-174328, 3GPP TSG SA WG2 Meeting #122, Jun. 26-30, 2017, 3 pages.
NTT DOCOMO, Inc., "WI Summary of New Radio Access Technology", RP 181724, 3GPP TSG RAN Meeting #81, Sep. 10-13, 2018, 19 pages.
Chinese Office Action dated Aug. 22, 2025 issued in counterpart application No. 202180036735.8, 18 pages.

* cited by examiner

FIG. 1

Scenario 1

Scenario 2

Scenario 3

4-01

SMF (or
other NFs)

4-02

NRF 4-03

1. Nnrf_NFDiscovery_Request (NF Type=UPF, TAI,
UPF with non-QoS limited backhaul connection,
required minimum backhaul latency, satellite
Category 4-04

2. Nnrf_NFDiscovery_Response (NF profile(s))

Example of TNL associations over different type of backhaul radio network

Example of backhaul characteristic based Registration procedure

Example of backhaul characteristic based PDU Session Establishment procedure

METHOD AND APPARATUS FOR MANAGING SESSION BY CONSIDERING BACKHAUL INFORMATION IN WIRELESS COMMUNICATION SYSTEM

PRIORITY

This application is a National Phase Entry of PCT International Application No. PCT/KR2021/006317 which was filed on May 21, 2021, and claims priority to Korean Patent Application Nos. 10-2020-0060966 and 10-2021-0015379, which were filed on May 21, 2020 and Feb. 3, 2021, respectively, the entire content of each of which is incorporated herein by reference.

TECHNICAL FIELD

The disclosure relates to a method and apparatus for session management in consideration of backhaul information in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system is considering support for various services compared to the existing 4G system. For example, the most representative services include enhanced mobile broad band (eMBB), ultra-reliable and low latency communication (URLLC), and massive machine type communication (mMTC), evolved multimedia broadcast/multicast service (eMBMS), and the like. In addition, a system providing the URLLC service may be referred to as a URLLC system, and a system providing the eMBB service may be referred to as an eMBB system. Also, the terms service and system may be used interchangeably.

Among them, the URLLC service is a service newly considered in the 5G system, unlike the existing 4G system, and requires to satisfy conditions of ultra-high reliability (e.g., about 10-packet error rate) and low latency (e.g., about 0.5 msec) compared to other services. In order to satisfy such strict requirements, the URLLC service may need to apply a shorter transmission time interval (TTI) than the eMBB service, and various operating methods using this are being considered.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As satellite communication technology is advanced, efforts are being made to integrate satellite communication technology, which has been introduced only limitedly, into a mobile communication network. In particular, research on introducing a satellite link into a backhaul section (a section between a radio access network (RAN) and a core network) connected typically by a wired link based on optical fiber is being conducted.

DISCLOSURE OF INVENTION

Technical Problem

In the 3rd generation partnership project (3GPP), standardization for various scenarios of integrating mobile communication and 5th generation (5G) technology in the 5G communication system is in progress. In particular, a method of introducing a satellite connection in the backhaul section connecting the radio access network (RAN) and the core network is being standardized. The satellite connection has various advantages such as reducing the cost of establishing a wired link (such as installing embedded fiber optic cables). On the other hand, upon applying the satellite technology to the backhaul section, a phenomenon such as a variable network situation or a high latency may occur, and an additional mechanism to satisfy the quality of service (QoS) in the 5G system may be required.

In order to solve this situation, a study conducted in the 3GPP discussed a user plane function (UPF) device selection technique considering the network latency of a session management function (SMF) device in a session creation procedure. However, because the discussed technique does not consider the existence of a satellite backhaul link for an access network (AN) to which a UE accesses, there may be a problem that even a UE making a session request through the AN having only a wired backhaul link may have to perform the UPF selection in consideration of the latency for UPFs. Therefore, a technique for providing the SMF with backhaul connection information of the AN in a session processing procedure and thereby supporting the SMF to perform the UPF selection in consideration of the latency only in a specific case may be required.

In addition, because the discussed technique does not consider whether the satellite backhaul network exists between the AN accessed by the UE and the core network, whether the control plane backhaul network for the N2 interface between the AN and the AMF and the user plane backhaul network for the N3 interface between the AN and the UPF use the same backhaul network, or the like, there may be a problem that in a protocol data unit (PDU) session establishment procedure, the UPF cannot be selected and N3 tunnel information cannot be determined in consideration of the latency occurring in the backhaul network. Therefore, a technique to determine the type of the backhaul network in the registration procedure and the session establishment procedure, select the UPF satisfying the QoS due to the latency occurring in the backhaul network, and avoid a situation in which N3 tunnel information allocation fails may be required.

The technical problems to be achieved in the disclosure are not limited to the above-mentioned problems, and other technical problems not mentioned are clearly understood from the following description by a person skilled in the art to which the disclosure belongs.

Solution to Problem

According to an embodiment of the disclosure, a session management method using backhaul information in an access network (AN) node of a wireless communication system may include selecting an access and mobility management function (AMF) upon receiving a registration request message from a user equipment (UE); selecting one transport network layer association (TNLA) from among candidate TNLAs for the selected AMF by considering a type of a backhaul network of a control plane; transmitting an initial UE message to the selected AMF by using the selected TNLA; and performing a registration procedure of the UE upon receiving a selected TNLA response signal from the selected AMF.

According to an embodiment of the disclosure, an access network (AN) node device for managing a session using backhaul information in a wireless communication system may include a transceiver configured to communicate with a specific node of the wireless communication system and communicate with a user equipment (UE); a memory configured to store session related information; and at least one processor configured to:
   select an access and mobility management function (AMF) upon receiving a registration request message from the UE through the transceiver, select one transport network layer association (TNLA) from among candidate TNLAs for the selected AMF by considering a type of a backhaul network of a control plane, transmit an initial UE message to the selected AMF by using the selected TNLA through the transceiver, and

4 perform a registration procedure of the UE upon receiving a selected TNLA response signal from the selected AMF.

The candidate TNLAs may include at least one of low earth orbits (LEO) and a geosynchronous earth orbit (GEO).

Advantageous Effects of Invention

According to the disclosure, when the user equipment (UE) requests a session creation through the AN connected via one or several satellite backhaul links in the 3GPP 5G system, the access and mobility management (AMF) device can efficiently determine whether a QoS-limited backhaul link (e.g., a satellite link) exists. In addition, based on this determination, the SMF may perform efficient UPF selection in consideration of a network situation.

According to the disclosure, when the UE requests registration and PDU session establishment to the core network through the AN connected via one or several backhaul networks in the 3GPP 5G system, the AMF can efficiently determine whether to use a QoS-limited backhaul network (e.g., a satellite backhaul network). Through this, the SMF may select an efficient UPF in consideration of a network situation, and based on this, configure a user data path.

Effects obtainable in the disclosure are not limited to the above-mentioned effects, and other effects not mentioned will be clearly understood by those of ordinary skill in the art to which the disclosure belongs from the description below.

BRIEF DESCRIPTION OF DRAWINGS

FIG. 1 is a diagram illustrating scenarios of applying a satellite backhaul in an existing 3GPP 5G system.

MODE FOR THE INVENTION

Figure 2:
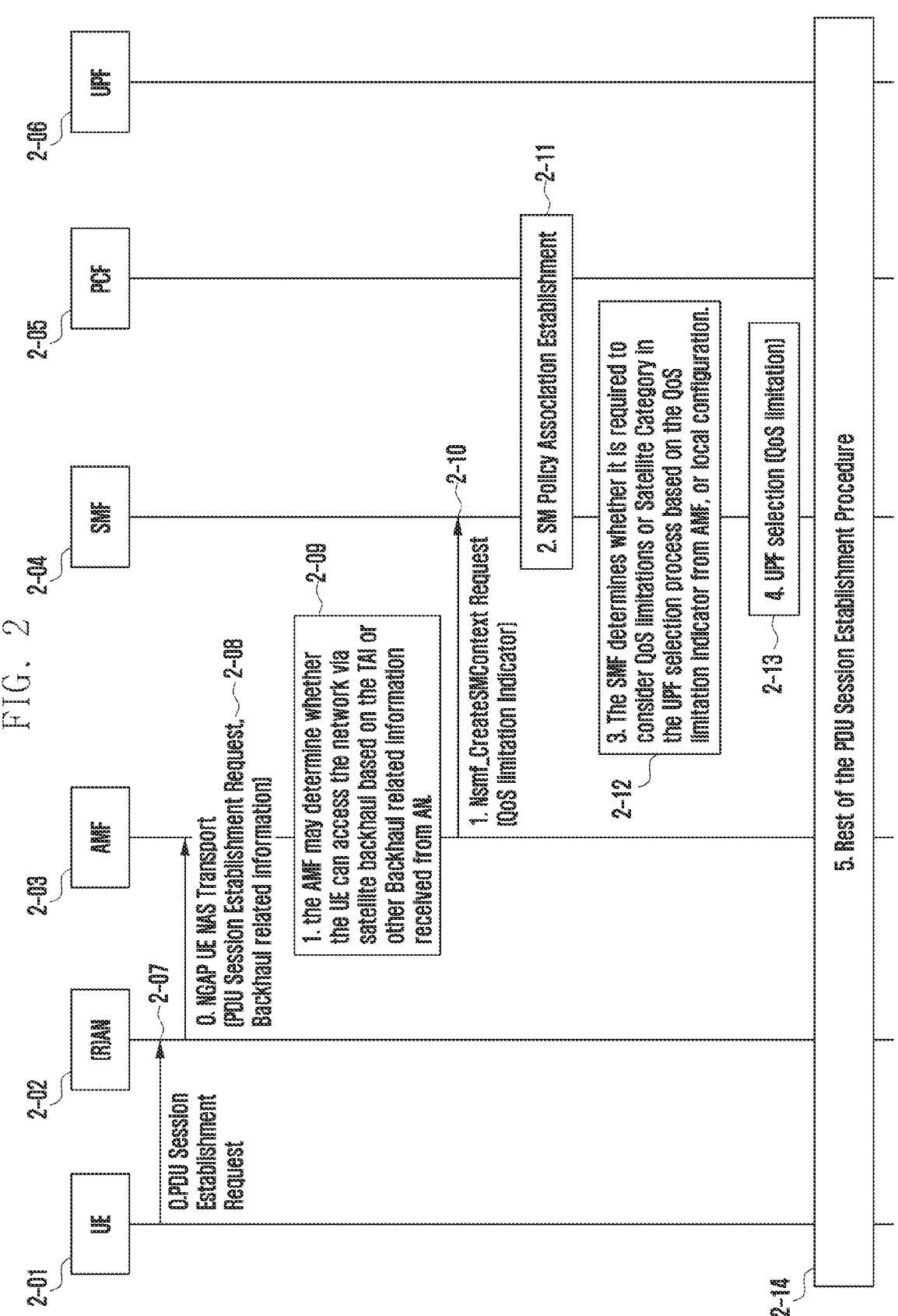
FIG. 2 is a diagram illustrating a method that an access and mobility management (AMF) enables a session management function (SMF) to perform selection of a user plane function (UPF) by considering backhaul connection information in a protocol data unit (PDU) session creation procedure, according to an embodiment of the disclosure.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, a nd may be applied in the same way to systems that conform other standards. Also, in the disclosure, a specific network function may be implemented with one network entity or may be implemented with one instance. When implemented with a network entity, for ex ample, one server may be implemented to perform one network function. Alternatively, a server may be constructed to include two or more network entities. In this case, the net work entities may perform the same function or perform different functions. For example, one server may include two or more AMFs. In another example, one server may include two or more SMFs. In this case, each of the network entities performing the same function may be implemented with instances.

In addition, one server may cover one region, and different servers may cover different regions. Therefore, the same network entity may also be implemented in servers located in different regions.

In another example, one network entity may be implemented using two or more servers.

Figure 1:
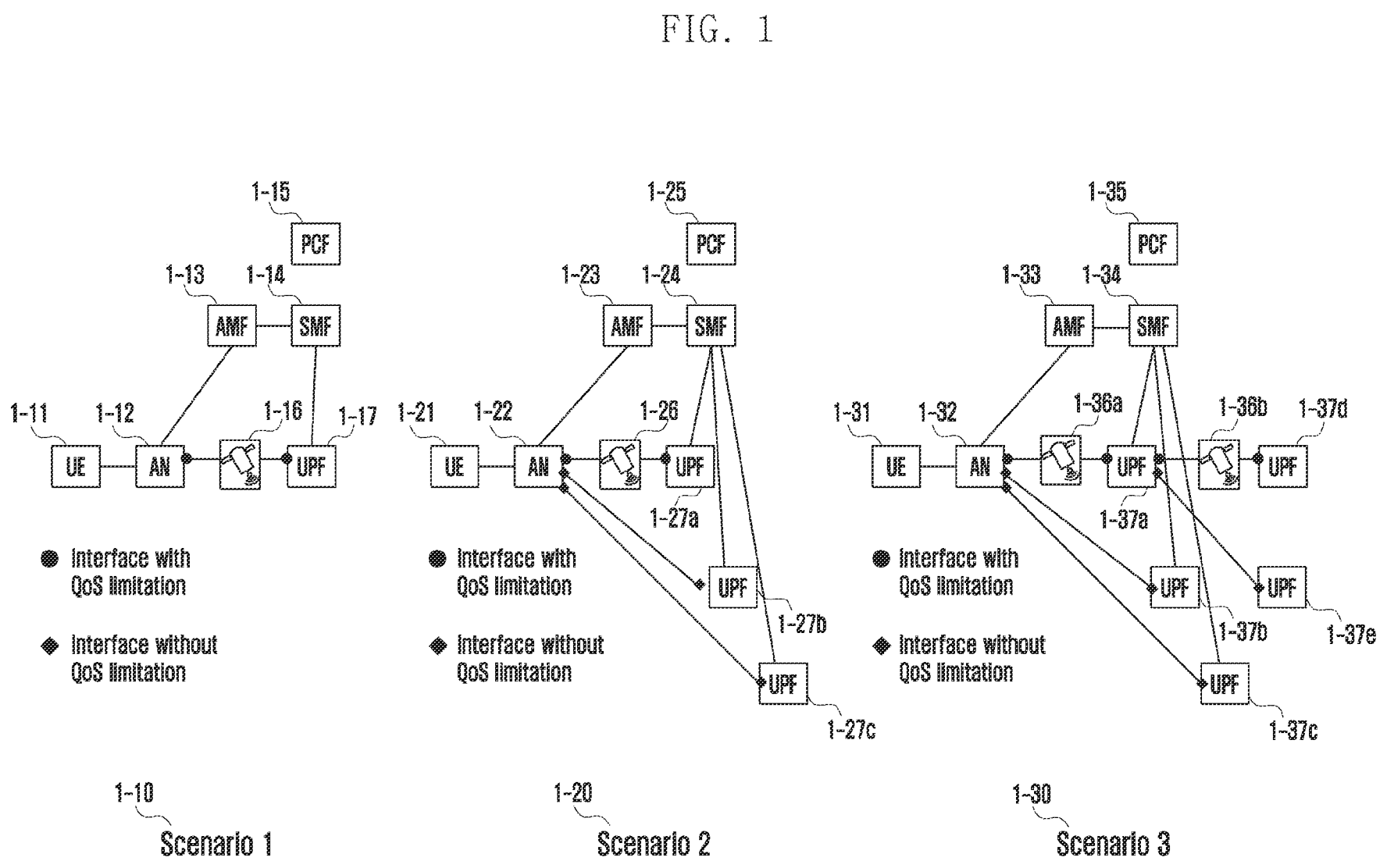

FIG. 1 is a diagram illustrating scenarios of applying a satellite backhaul in an existing 3GPP 5G system.

The 5G system is composed of an access network (AN) for providing radio access to a terminal (e.g., user equipment (UE)), and the following main network equipment: an access and mobility management function (AMF), a session management function (SMF), a user plane function (UPD), and a policy control function (PCF). The AMF, the SMF, and the PCF are located in a control plane. The AMF performs a function of managing the mobility of each UE, the SMF performs a UE session management function and a UPF management function through an N4 interface, and the PCF provides a UE policy control function. Meanwhile, the UPF is located on a user plane, namely, a plane through which user data passes, and performs a function of transferring user data. In addition, the AN provides a radio access function to the UE, transfers control plane data of the UE to the AMF (here, an interface between the AN and the AMF is called N2), and transfers user plane data of the UE to the UPF (here, an interface between the AN and the UPF is called N3). A PDU session creation procedure is to create a path for the UE to send user data. A PDU session creation request message sent by the UE to the AN is delivered to the SMF through the AN and the AMF. After receiving a relevant policy from the PCF, the SMF may select the UPF. Upon selecting the UPF, a query message may be sent to a network repository function (NRF) device to select the UPF. Thereafter, an operation of configuring a path of the user plane for the UE to the AN and the UPF is performed, and when the operation is ended, the UE is notified that the PDU session creation is completed.

Meanwhile, in the 5G system, a backhaul refers to a system that connects data collected from a user's Internet access device, such as the UE, to a backbone network. A backhaul connection for connecting the UPF and a gNB (next generation Node B, gNodeB, a base station, or the AN) or the UPF and the UPF may have the following two states:
1) in the case where there is a QoS limitation (e.g., backhaul using a satellite connection), and
2) in the case where there is no QoS limitation (e.g., backhaul using a wired connection).

With reference to FIG. 1, three scenarios of applying the existing satellite backhaul can be presented. The disclosure intends to solve typical problems upon a backhaul connection in the case where there is a QoS limitation (e.g., backhaul using a satellite connection).

A first scenario 1-10 may be the case in which a backhaul connection between the AN 1-12 and the UPF 1-17 and a backhaul connection between the AN 1-12 and the AMF 1-13 use only one type of backhaul connection.

A second scenario 1-20 may be the case in which the AN 1-12 has various types of backhaul connections with the UPFs 1-27a, 1-27b, and 1-27c.

A third scenario 1-30 shows the case in which the UPFs 1-37a, 1-37b, and 1-37c have different types of backhaul connections with other UPFs 1-37d and 1-37e.

The existing technology proposed in the 3GPP for a situation of the first scenario 1-10 is to deliver, when the backhaul connection of the AN 1-12 is a satellite 1-16, information on the category (e.g., low earth orbits (LEO), medium earth orbits (MEO), geosynchronous earth orbits (GEO)) of the satellite for the backhaul connection to the AMF 1-13. In the session creation procedure, the AMF 1-13 may determine the satellite category for the N3 (an interface between the gNB and the initial UPF) through which a session passes (or is formed) based on the received information, and send it to the SMF 1-14. Based on the satellite category and information in the session creation message of the UE, the SMF 1-14 may determine whether to reject or accept the creation request.

In the second scenario 1-20 and the third scenario 1-30, unlike the first scenario 1-10, the ANs 1-22 and 1-32 may be connected to a plurality of UPFs 1-27a, 1-27b, 1-27c, 1-37a, 1-37b, and 1-37c, respectively, via different backhaul connection types, and the connected UPF 1-37a may also be connected to other UPFs 1-37d and 1-37e via different backhaul connection types. In this case, a function capable of selecting appropriate UPFs in consideration of information such as latency is essential in the PDU session creation procedure.

For this purpose, in the existing technology proposed by the 3GPP, in the PDU session creation procedure, the UPF may measure a latency (hereinafter, referred to as QoS limitation) with connected entities (e.g., the AN or the UPF) and notify it to the SMF 1-24 or 1-34, and the SMF 1-24 or 1-34 may select the UPF based on the QoS limitation. As such, although a method for the SMF 1-24 or 1-34 to select the UPF in consideration of latency has been presented, there is a problem that, for all PDU session creation requests, UPF selection must be performed in consideration of QoS limitation information for all UPFs. For example, there is a problem that, even in the case where a session request is made through the AN having only a wired backhaul connection type, the UPF selection must be performed unnecessarily considering latency. In addition, there is a problem that, in the case where a session request is made through the AN having a satellite backhaul connection, the UPF selection must be performed considering the latency of all UPFs rather than considering the latency of UPFs connected to the corresponding AN.

FIG. 2 is a diagram illustrating a method that an AMF enables an SMF to perform selection of a UPF by considering backhaul connection information in a PDU session creation procedure, according to an embodiment of the disclosure.

A user equipment (UE) 2-01 may perform a PDU session establishment request to the AMF 2-03 (step 2-07). Upon receiving a PDU session establishment request message from the UE 2-01 (step 2-07), a radio access network (RAN) 2-02 may determine whether there is a backhaul with QoS limitation among its backhaul connections, and if there is a backhaul with QoS limitation, include backhaul-related information in a NAS transport message. At this time, the RAN 2-02 may include an indicator (QoS limitation indicator) or information per backhaul connection (e.g., satellite category information per user plane interface of the AN, latency information per user plane interface of the AN) indicating the existence of at least one backhaul connection with QoS limitation in the backhaul-related information and transmit it to the AMF 2-03 (step 2-08).

The AMF 2-03 may determine whether the AN 2-02 accessed by the UE 2-01 has a backhaul connection with QoS limitation (step 2-09). In the following cases, the AMF 2-03 may determine that the AN 202 has a backhaul connection with QoS limitation. If the message of the step 2-08 contains the backhaul-related information, the AMF 2-03 may determine that a backhaul connection with QoS limitation exists. If information on the existence of a backhaul connection with QoS limitation for each tracking area identifier (TAI) is configured in the AMF 2-03, the AMF 2-03 may determine that a backhaul connection with QoS limitation exists, based on a TAI value from the AN 2-02 and the configured information. Alternatively, it can be determined through local configuration (step 2-09).

If determining at the step 2-09 that a backhaul connection with QoS limitation exists, the AMF 2-03 may include a QoS limitation indicator in an SM context creation request message transmitted to the SMF 2-04 (step 2-10).

The SMF 2-04 may perform SM policy establishment with a point coordination function (PCF) 2-05 (step 2-11).

The SMF 2-04 may determine whether to perform UPF selection in consideration of the QoS limitation of the UPF 2-08 or the satellite category (step 2-12). At this time, if the message of the step 2-10 contains the QoS limitation indicator, the SMF 2-04 may determine that there is a backhaul connection with QoS limitation, and determine that the UPF selection should be performed in consideration of the QoS limitation or the satellite category (step 2-12). Alternatively, if the TAI value from the message of the step 2-10 indicates that there is a backhaul connection with QoS limitation in the AMF 2-03, the SMF 2-04 may determine that there is a backhaul connection with QoS limitation, and determine that the UPF selection should be performed in consideration of the QoS limitation of the UPF or the satellite category (step 2-12).

If the SMF 2-04 determines at the step 2-12 that the UPF selection should be performed in consideration of the QoS limitation (e.g., latency, etc.) for each a third layer (layer 3, L3) interface (e.g., Internet Protocol (IP) interface) of the UPF 2-08 or the satellite category, the SMF 2-04 may perform the UPF selection considering the QoS limitation of the UPF or the satellite category information (step 2-13).

Thereafter, the rest PDU session creation procedure may be performed between the UE 2-01 and the UPF 2-08 (step 2-14).

Figure 3:
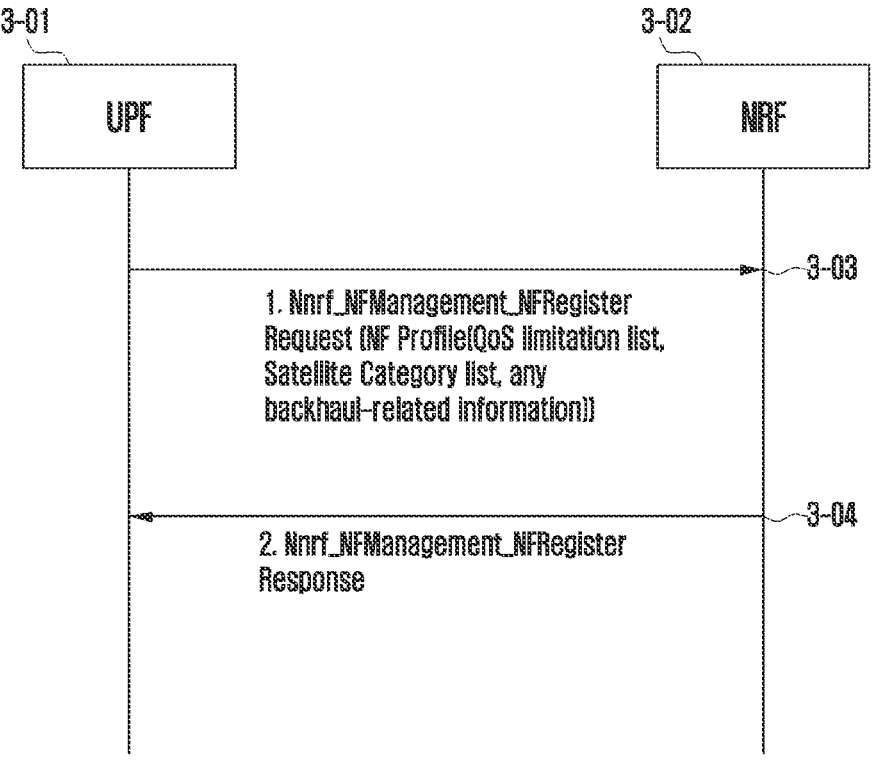
FIG. 3 is a diagram illustrating a method that a user plane function (UPF) having a backhaul connection with a quality of service (QoS) limitation registers at a network repository function (NRF), according to an embodiment of the disclosure.

FIG. 3 is a diagram illustrating a method that a UPF 3-01 having a backhaul connection with a QoS limitation registers at an NRF 3-02, according to an embodiment of the disclosure.

If there is a backhaul interface using a satellite connection, the UPF 3-01 may include, in an NF profile for registration at the NRF, a QoS limitation list (i.e., when the UPF 3-01 is connected with other UPFs in the user plane via L3 communication, each latency information for all connected UPFs) composed of a QoS limitation (e.g., latency) per its L3 interface (e.g., IP interface), a satellite category list (i.e., when the UPF is connected with other UPFs in the user plane via L3 communication, each satellite category information for all connected UPFs) composed of a satellite category (e.g., LEO, MEO, GEO) per its L3 interface, and other backhaul interface related information per its L3 interface. At this time, the UPF 3-01 may include some or all of the above-mentioned parameters (QoS limitation list, satellite category list, and other backhaul interface related information). That is, the UPF 3-01 capable of transmitting the QoS limitation list to the SMF (not shown in FIG. 3) may include the QoS limitation list in the NF profile transmitted to the NRF 3-02. In addition, the UPF 3-01 supporting the transmission of the satellite category list to the SMF (not shown in FIG. 3) may include the satellite category list in the NF profile transmitted to the NRF 3-02, and the UPF 3-01 supporting the transmission of other backhaul interface related information may include the corresponding other backhaul interface related information in the NF profile transmitted to the NRF 3-02 (step 3-03).

The NRF 3-20 transmits a response message to the UPF 3-01 (step 3-04).

Figure 4:
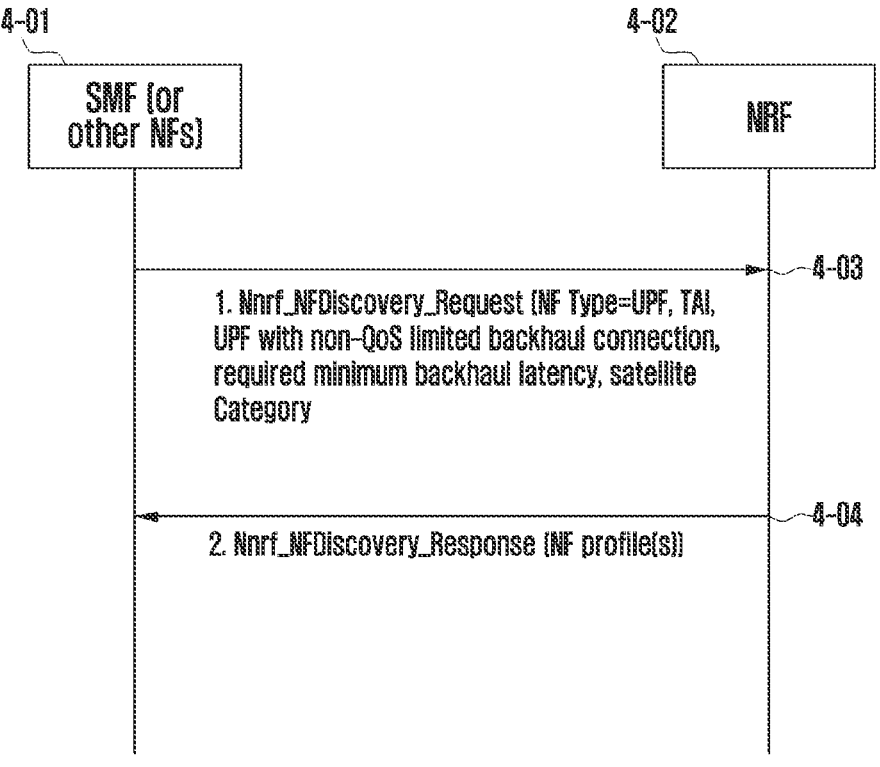
FIG. 4 is a diagram illustrating a method that a session management function (SMF) selects a user plane function (UPF) through a network repository function (NRF) in a protocol data unit (PDU) session creation procedure via an access network (AN) having a backhaul connection with a quality of service (QoS) limitation, according to an embodiment of the disclosure.

FIG. 4 is a diagram illustrating a method that an SMF 4-01 selects a UPF through an NRF 4-02 in a PDU session creation procedure via an AN having a backhaul connection with a QoS limitation, according to an embodiment of the disclosure.

If the SMF 4-01 determines in the PDU session creation procedure that the AN accessed by the UE has a backhaul connection with one or more QoS limitations, and if the SMF 4-01 desires to select the UPF having a backhaul connection, with the AN, without QoS limitation, the SMF 4-01 may include the UPF with non-QoS limited backhaul connection in a query message and transmit it to the NRF 4-02 at step 4-03. In addition, when desiring to limit a UPF candidate group to UPFs connected to the AN, the SMF 4-01 may include the TAI corresponding to location information of the UE and transmit it to the NRF 4-02.

If the SMF 4-01 determines in the PDU session creation procedure that the AN accessed by the UE has a backhaul connection with one or more QoS limitations, and if the SMF 4-01 desires to select the UPF having a backhaul connection, with the AN, with latency lower than a required minimum backhaul latency, the SMF 4-01 may include the required minimum backhaul latency and transmit it to the NRF 4-02. In addition, when desiring to limit a UPF candidate group to UPFs connected to the AN, the SMF 4-01 may include the TAI corresponding to location information of the UE and transmit it to the NRF 4-02.

If the SMF 4-01 determines in the PDU session creation procedure that the AN accessed by the UE has a backhaul connection with one or more QoS limitations, and if the SMF 4-01 desires to select the UPF having a backhaul connection of a specific satellite category with the AN, the SMF 4-01 may include the satellite category and transmit it to the NRF 4-02. In addition, when desiring to limit a UPF candidate group to UPFs connected to the AN, the SMF 4-01 may include the TAI corresponding to location information of the UE and transmit it to the NRF 4-02 (step 4-03).

When there are the TAI and the UPF with non-QoS limited backhaul connection in the message of the step 4-03 transmitted by the SMF 4-01, the NRF 4-02 does not include, in a response message, information on UPFs with the QoS limitation in their interfaces among UPFs having interfaces corresponding to the TAI.

When there are the TAI and the required minimum backhaul latency in the message of the step 4-03 transmitted by the SMF 4-01, the NRF 4-02 does not include, in a response message, information on UPFs with the latency (i.e., QoS limitation) higher than the required minimum backhaul latency in their interfaces among UPFs having interfaces corresponding to the TAI.

When there are the TAI and the satellite category in the message of the step 4-03 transmitted by the SMF 4-01, the NRF 4-02 does not include, in a response message, information on UPFs using the satellite category in their interfaces among UPFs having interfaces corresponding to the TAI.

The NRF 4-02 transmits the response message through at least one and/or a combination of the above-described schemes (step 4-04).

Figure 5:
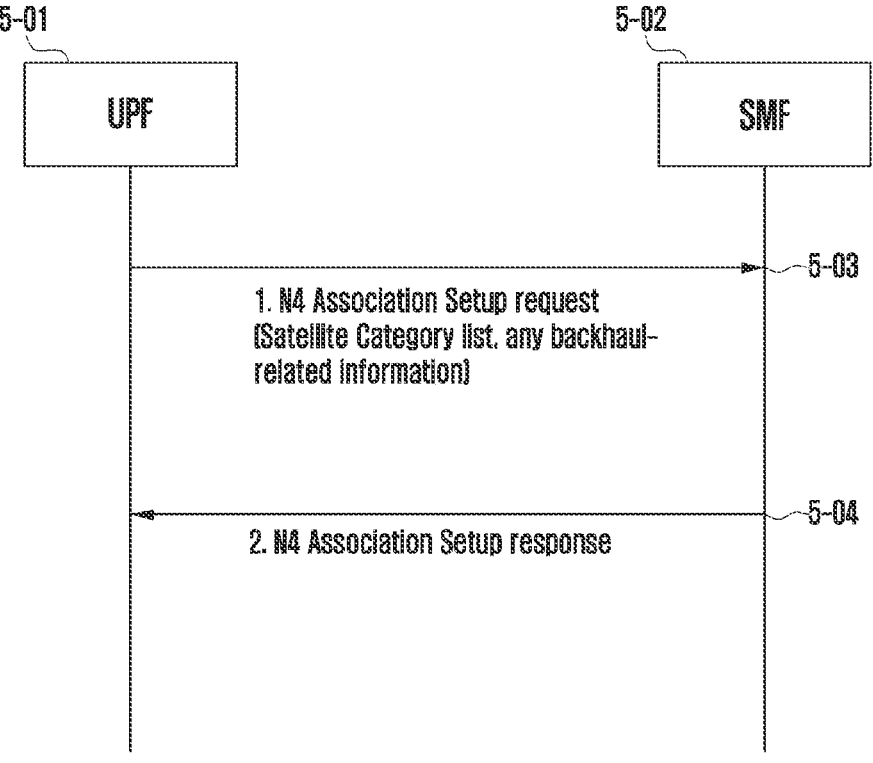
FIG. 5 is a diagram illustrating a method that a user plane function (UPF) having a backhaul connection with a quality of service (QoS) limitation performs a request for N4 (interface between SMF and UPF) association setup to a session management function (SMF), according to an embodiment of the disclosure.

FIG. 5 is a diagram illustrating a method that a UPF 5-01 having a backhaul connection with a QoS limitation performs a request for N4 (interface between SMF and UPF) association setup to an SMF 5-02, according to an embodiment of the disclosure.

In the case that there is a backhaul interface using satellite connection, the UPF 5-01 includes, in a message requesting the N4 association setup with the SMF 5-02, a satellite category list (i.e., when the UPF is connected with other UPFs in the user plane via L3 communication, each satellite category information for all connected UPFs) composed of a satellite category (e.g., LEO, MEO, GEO) per its L3 interface, and other backhaul interface related information per its L3 interface. In this case, the UPF 5-01 may include some or all of the above-mentioned parameters (step 5-03).

The SMF transmits a response message corresponding to the received message (step 5-04).

Figure 6:
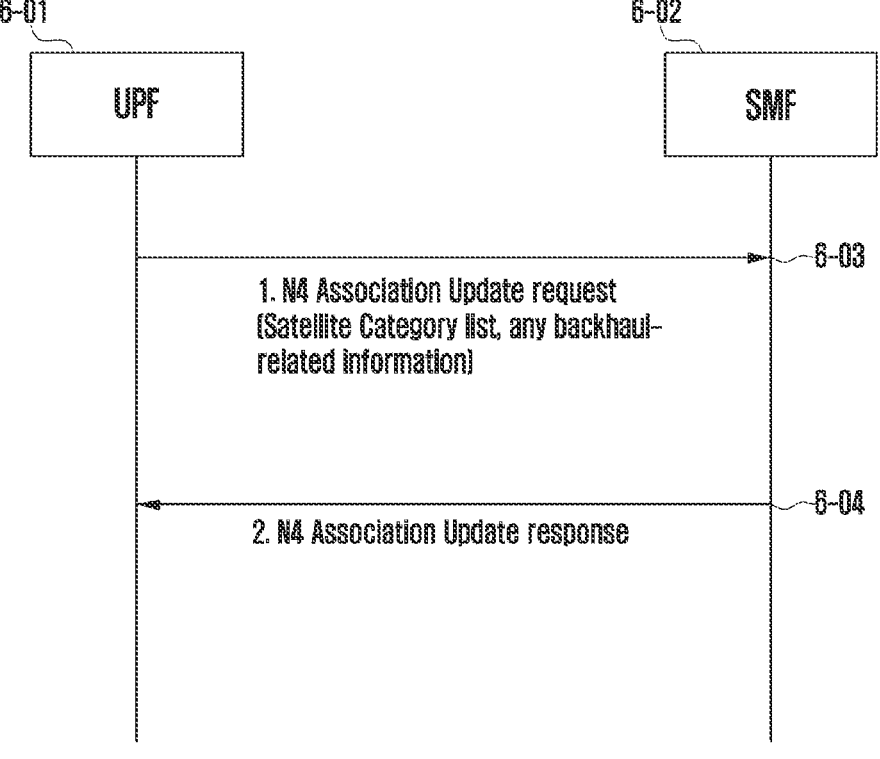
FIG. 6 is a diagram illustrating a method that a user plane function (UPF) having a backhaul connection with a quality of service (QoS) limitation performs a request for N4 (interface between SMF and UPF) association update to a session management function (SMF), according to an embodiment of the disclosure.

FIG. 6 is a diagram illustrating a method that a UPF 6-01 having a backhaul connection with a QoS limitation performs a request for N4 (interface between SMF and UPF) association update to an SMF 6-02, according to an embodiment of the disclosure.

In the case of detecting a backhaul interface using satellite connection, the UPF 6-01 includes, in an N4 association update message sent to the SMF 6-02, a satellite category list (i.e., when the UPF is connected with other UPFs in the user plane via L3 communication, each satellite category information for all connected UPFs) composed of a satellite category (e.g., LEO, MEO, GEO) per its L3 interface, and other backhaul interface related information per its L3 interface. In this case, the UPF may include some or all of the above-mentioned parameters (step 6-03).

The SMF 6-02 transmits a response message (step 6-04).

Figure 7:
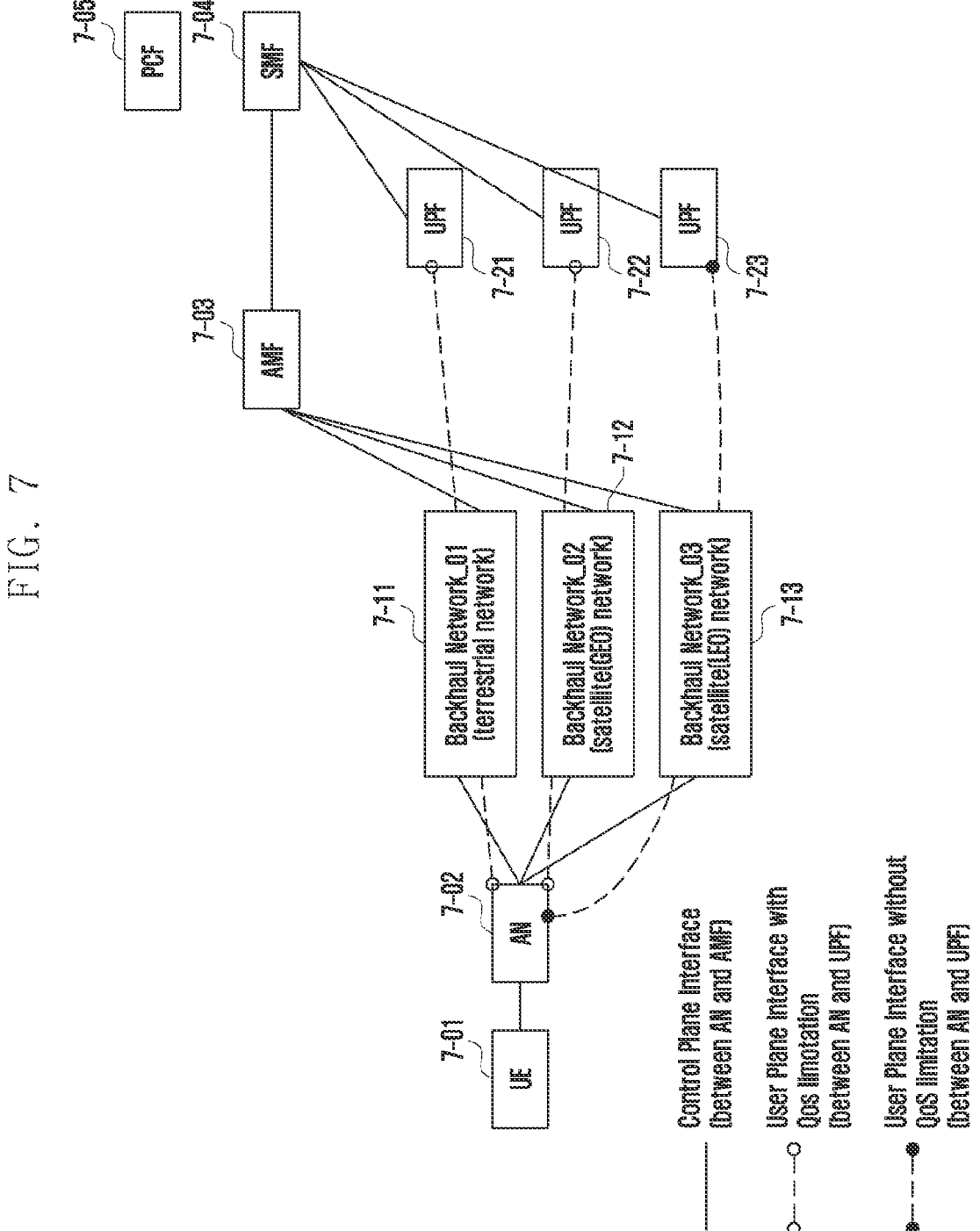
FIG. 7 is a diagram illustrating a scenario of applying terrestrial and satellite backhaul networks to a control plane and a user plane in a 3GPP 5G system, according to an embodiment of the disclosure.

FIG. 7 is a diagram illustrating a scenario of applying terrestrial and satellite backhaul networks to a control plane and a user plane in a 3GPP 5G system, according to an embodiment of the disclosure.

FIG. 7 corresponds to a case in which the first to third scenarios shown in FIG. 1 are expanded. First, in FIG. 7, a UE 7-01, an AN 7-02, UPFs 7-21, 7-22, and 7-23, an AMF 7-03, an SMF 7-04, and PCF 7-05 are shown as entities. Embodiments of the disclosure to be described with reference to FIGS. 8 to 10 may be based on the scenario shown in FIG. 7. In the 3GPP 5G system, the backhaul network may provide a connection between the RAN and the core network, and different types of communication protocols may be applied to the control plane and the user plane. As such backhaul networks, FIG. 7 exemplarily shows a terrestrial backhaul network 7-11, a geosynchronous earth orbits (GEO) satellite backhaul network 7-12, and a low earth orbits (LEO) satellite backhaul network 7-13. The backhaul networks may be further subdivided into low earth orbits (LEO), medium earth orbits (MEO), and geosynchronous earth orbits (GEO) corresponding to high earth orbits, as described in the above first to third scenarios. In addition, the backhaul network used in the control plane and the backhaul network used in the user plane may or may not be the same. The AN 7-02 may determine which backhaul network is used. In the case of the control plane, the AN 7-02 may determine which backhaul network is used in the registration procedure, and in the case of the user plane, the AN 7-02 may determine which backhaul network is used in the PDU session establishment procedure. For example, when initiating a control plane connection through the N2 interface with the AMF 7-03 in the registration procedure, the AN 7-02 may select the GEO satellite backhaul network 7-12 (backhaul Network_02 in FIG. 7), and in this case, a transmission latency greater than that of the terrestrial backhaul network 7-11 (Backhaul Network_01 in FIG. 7) may occur. Thereafter, when the UPF and the AN 7-02 allocate tunnel information supporting a GTP-U path through the GEO satellite backhaul network in a process of allocating tunnel information for the N3 interface in the PDU session establishment procedure, the control plane and the user plane come to use the same backhaul network. In addition, if tunnel information supporting a GTP-U path through the terrestrial backhaul network 7-11 (Backhaul Network_01 in FIG. 7) or the LEO satellite backhaul network 7-13 (Backhaul Network_03 in FIG. 7) is allocated, the control plane and the user plane come to use different backhaul networks. When different types of backhaul networks are used in the control plane and the user plane, it is possible to adaptively respond according to the location of each of the NFs constituting the core network and the traffic conditions of the backhaul network.

Figure 8:
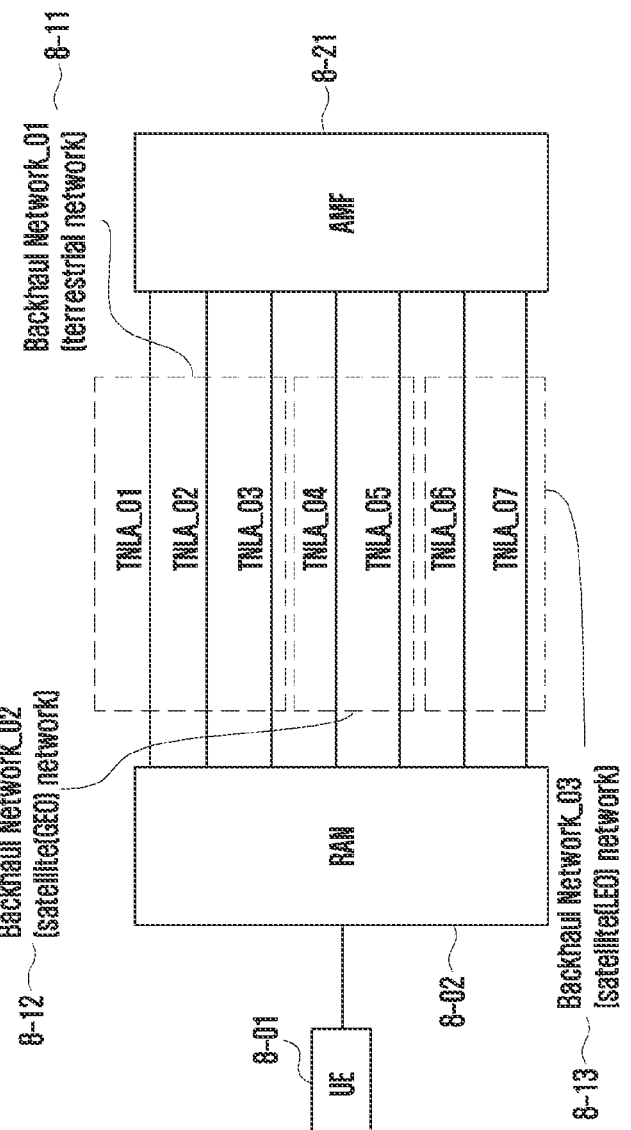
FIG. 8 is a diagram illustrating a relationship between a transport network layer association (TNLA or TNL association) and a backhaul network used in a control plane in a 3GPP 5G system, according to an embodiment of the disclosure.

FIG. 8 is a diagram illustrating a relationship between a transport network layer association (TNLA or TNL association) and a backhaul network used in a control plane in a 3GPP 5G system, according to an embodiment of the disclosure.

In FIG. 8, a UE 8-01 is connected to an RNA 8-02, and the RNA 8-02 is connected to an AMF 8-21 through different backhaul networks 8-11, 8-12, and 8-13. In this case, the control plane connection between one RAN 8-02 and one AMF 8-21 may consist of one or more TNL associations. FIG. 8 exemplarily shows that a first backhaul network 8-11 has three different TNLAs (TNLA_01, TNLA_02, TNLA_03), a second backhaul network 8-12 has two different TNLAs (TNLA_04, TNLA_05), and a third backhaul network 8-13 has two different TNLAs (TNLA_06, TNLA_07).

In the process of initiating the N3 interface with the specific AMF 8-21, the RAN 8-02 may select one of the TNL associations (candidate TNL associations) connected to the AMF 8-21. Upon receiving a message to be delivered to the AMF 8-21 from the UE 8-01, the RAN 8-02 may transmit the message to the AMF 8-21 through the selected TNL association. The AMF 8-21 may determine whether to continuously use the TNL association selected by the RAN 8-02 as the N3 interface or to change it to another TNL association. In the case of determining to change to another TNL association, the AMF 8-21 may transmit a message to be delivered to the UE 8-01 to the RAN 8-02 through the selected TNL association. If the AMF 8-21 does not find an appropriate connection among the TNL associations with the RAN 8-02, the AMF 8-21 may select another appropriate AMF, notify it to the RAN 8-02, and initiate a reroute procedure so that the message to be delivered to the UE 8-01 can be transmitted through the selected another AMF. Also, when the RAN 8-02 selects a TNL association, a method of considering (1) availability and (2) a weight factor of candidate TNL associations may be provided.

According to an embodiment of the disclosure, when the TNL association of the RAN 8-02 is selected, a method of further considering (3) a backhaul network type of candidate TNL associations may be provided. The RAN 8-02 may select a TNL association based on a combination of some or all of (1), (2), and (3), and notify the backhaul network type of the selected TNL association to the AMF 8-21. For example, in FIG. 8, when the RAN 8-02 selects TNLA_04 among the second backhaul networks, the RAN 8-02 may notify the AMF 8-21 that the selected TNLA uses a satellite backhaul network and thus a greater latency than the terrestrial backhaul network may be caused. In determining whether another TNLA is more suitable instead of the TNLA_04 selected by the RAN 8-02, the AMF 8-21 may select TNLA_05 using the same backhaul network, based on information on the backhaul network type informed by the RAN 8-02, or select TNLA_01 using a different backhaul network to change the NGAP UE-TNLA-binding. The AMF 8-21 and other network function (NF) devices of the core network may select TNL association passing through the corresponding backhaul network in order to select a backhaul network with smaller or greater latency in consideration of the resource distribution (load balancing) of the N3 interface or the importance of the NAS message to be delivered to the UE, etc., based on the type of backhaul network.

Figure 9:
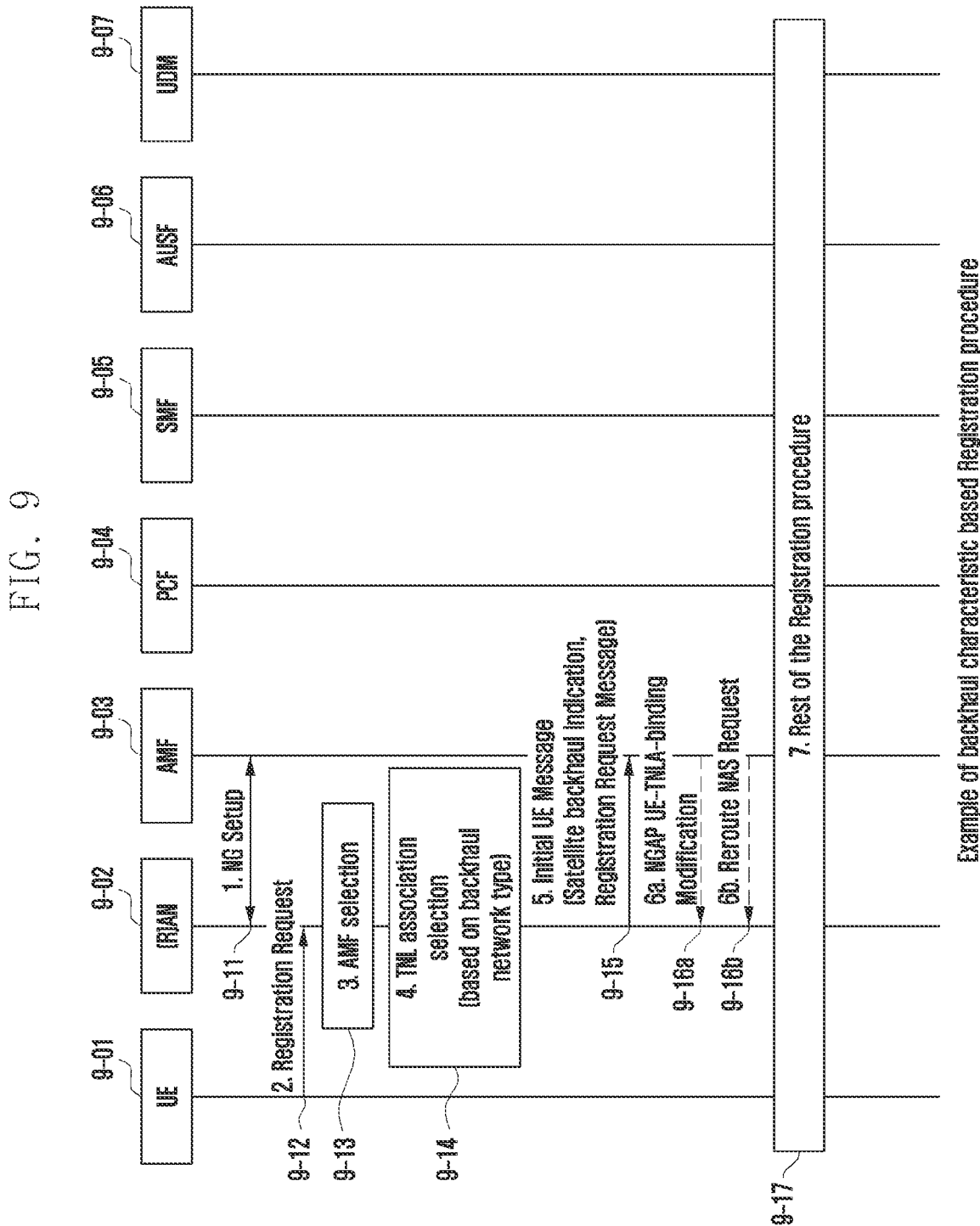
FIG. 9 is a diagram illustrating a method that an RAN and an AMF perform TNL association selection depending on characteristics of a backhaul network used for a control plane in a registration procedure, according to an embodiment of the disclosure.

FIG. 9 is a diagram illustrating a method that an RAN and an AMF perform TNL association selection depending on characteristics of a backhaul network used for a control plane in a registration procedure, according to an embodiment of the disclosure.

At step 9-11, an RAN 9-02 may perform a setup procedure for providing information on radio interfaces with UEs located within radio coverage of the RAN 9-02 to AMFs of a location (physical and/or logical location) connectible to the RAN 9-02 on the network. The NG setup assumes that candidate TNL associations are activated between the RAN 9-02 and the AMF 9-03. In the NG setup step, the RAN 9-02 may deliver, to the AMF 9-03, information of a radio section between the UE 9-01 and the RAN 9-02, such as a global RAN node ID, supported tracking areas (TAs), a broadcast PLMN list, radio access technology (RAT) information, and the like. When it is configured so that only a specific type of backhaul network can be connected to the TA covered by the RAN 9-02, the RAN 9-02 may deliver information on the type of the corresponding backhaul network to the AMF 9-03.

At step 9-12, the UE 9-01 may transmit a registration request message to the RAN 9-02.

At step 9-13, the RAN 9-02 may select the AMF.

At step 9-14, the RAN 9-02 may select one of the candidate TNL associations for the AMF selected at the step 9-13. In this case, the RAN 9-02 may perform selection in consideration of the type of backhaul network through which the candidate TNL association is passing. If the selected TNL association uses a backhaul network having a greater latency characteristic, the RAN 9-02 may determine whether to notify it to the AMF 9-03. This determination may refer to single-network slice selection assistance information (S-NSSAI)requested by the UE, RAT information or TA information of the corresponding RAN 9-02, the location of the UE 9-01, and the like.

At step 9-15, the RAN 9-02 may transmit an initial UE message to the AMF 9-03 through the TNL association selected at the step 9-14. The initial UE message may include a satellite backhaul indication when, according to the determination of the step 9-14, the backhaul network can use a satellite or the backhaul network, even not a satellite, having a high latency characteristic is used. The satellite backhaul indication may be considered in the following cases. In the case that the AMF 9-03 selects TNL association again due to the high latency of the selected backhaul network, in the case that the SMF 9-05 performs UPF selection, in the case that the SMF 9-05 and the RAN 9-02 allocate N3 tunnel information (CN Tunnel Info, AN Tunnel Info) for user plane data traffic transmission, or in the case that the SMF 9-05 and/or the PCF 9-04 determine an access network packet delay budget (AN PDB), which is the maximum allowable latency between the AN and the UPF, the satellite backhaul indication may be considered. The initial UE message may include the registration request message received from the UE 9-01 at the step 9-12. Upon receiving the initial UE message from the RAN 9-02, the AMF 9-03 may determine whether to use or change the TNL association used when the message is transmitted. If it is decided to change, at step 9-16a, the AMF 9-03 may transmit a next generation application protocol (NGAP) UE-TNLA-binding modification message to the RAN 9-02 through newly selected TNL association, and the RAN 9-02 may modify the NGAP UE-TNLA-binding with the UE 9-01. If the AMF 9-03 determines that there is another AMF having a TNL association with the RAN 9-02 in the AMF set to which it belongs, and that the AMF has a more suitable TNL association, the AMF 9-03 may transmit, at step 9-16*b*, a reroute NAS request message to the RAN 9-02. The RAN 9-02 may identify the AMF set ID included in the reroute NAS request message and perform an operation of selecting another AMF. Here, if another AMF is selected, the RAN 9-02 may perform the steps 9-14 and 9-15 again. Also, in FIG. 9, the case of receiving a simple response message is not specifically mentioned. That is, when the RAN 9-02 receives a response message from the selected AMF through the selected TNLA, steps 9-17 may be performed.

At the step 9-17, the 3GPP 5G system may perform the remaining registration procedure.

Figure 10:
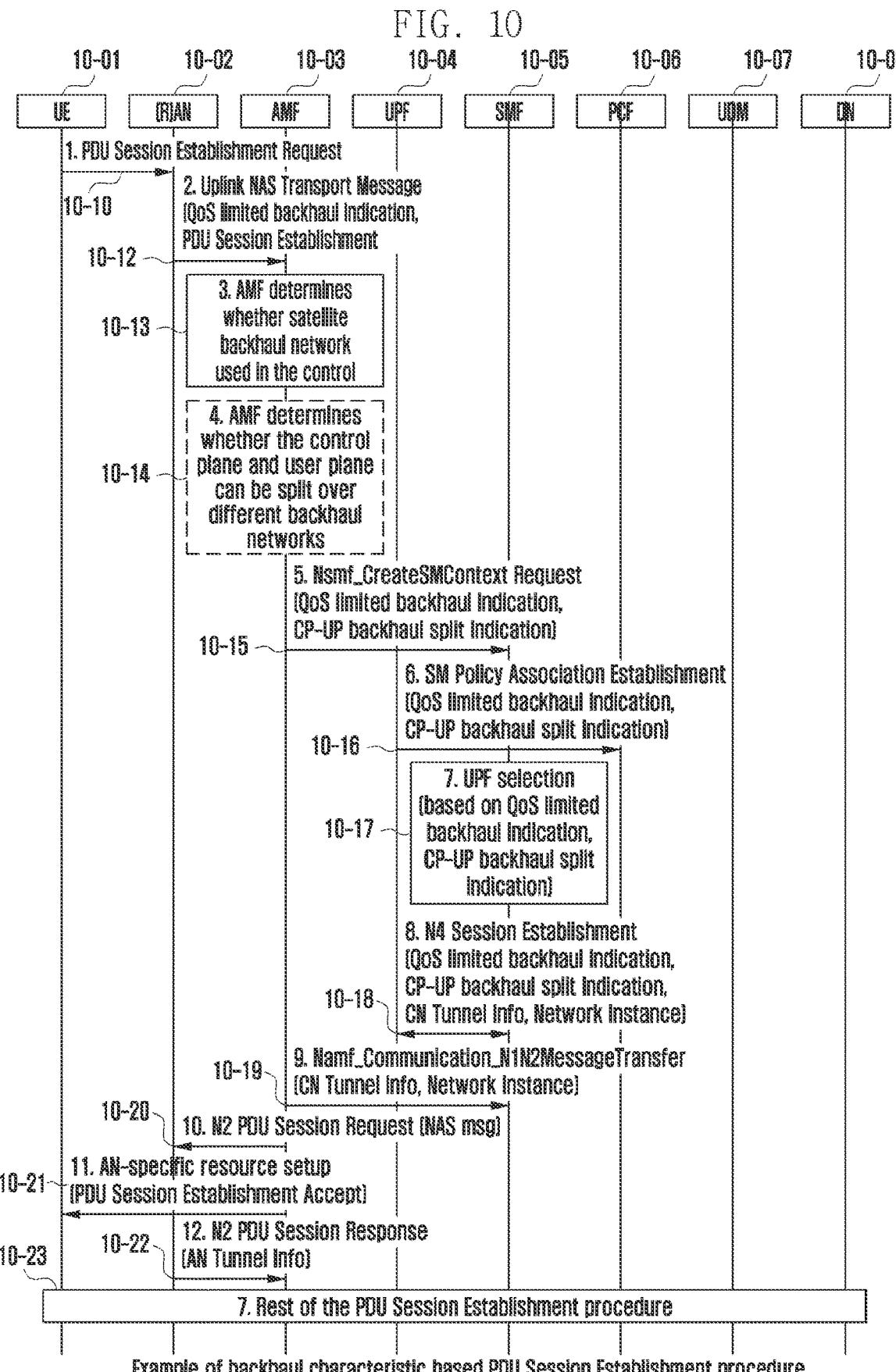
FIG. 10 is a diagram illustrating a PDU session establishment procedure in consideration of characteristics of a backhaul network, according to an embodiment of the disclosure.

FIG. 10 is a diagram illustrating a PDU session establishment procedure in consideration of characteristics of a backhaul network, according to an embodiment of the disclosure.

At step 10-11, the UE 10-01 may transmit a PDU session establishment request message to the RAN 10-02.

At step 10-12, the RAN 10-02 may determine the type of a backhaul network through which the TNL association selected in the registration procedure passes, by referring to the NGAP UE-TNLA binding associated with the UE 10-01 that made the request of the step 10-1. The RAN 10-02 may determine whether a QoS limitation is likely to occur in the user plane according to the type and characteristics of the backhaul network used in the control plane, and may determine whether to notify it to the AMF 10-03. The RAN 10-02 may determine to deliver the QoS limited backhaul indication to the AMF 10-03 in the following cases of (a) to (e).

(a) In the case that the selected backhaul network is a satellite backhaul network (b) In the case that the selected backhaul network is a satellite backhaul network and there is no other candidate backhaul network (c) In the case that the selected backhaul network is a satellite backhaul network and there is a satellite backhaul network among other candidate backhaul networks (d) In the case that the selected backhaul network is a terrestrial backhaul network and the RAN can provide a GTP-U channel through a satellite backhaul network (e) In the case that the selected backhaul network is a satellite backhaul network and the RAN can provide a GTP-U channel through a satellite backhaul network In addition, the RAN 10-02 may determine not to deliver the QoS limited backhaul indication to the AMF 10-03 in the following cases of (f) to (g).

(f) In the case that the selected backhaul network is a terrestrial backhaul network and there is no other candidate backhaul network (g) In the case that the selected backhaul network is a terrestrial backhaul network and another candidate backhaul network is also a terrestrial backhaul network In this case, the QoS limited backhaul indication may provide information in the following forms of (h) to (l).

(h) Whether a QoS limitation can occur in the user plane (i) Whether a satellite can be used for a backhaul network through which the NG interface passes (j) The type of a backhaul network used in the control plane (e.g., terrestrial, satellite, GEO satellite, MEO satellite, LEO satellite)

(k) Types of backhaul networks that can be used in the user plane (l) Whether the use of different kinds of backhaul networks is permitted in the control plane and the user plane (m) Combination of all or some of (h) to (l) above At step 10-13, the AMF 10-03 may determine the type of backhaul network through which the TNL association selected in the registration procedure passes. The AMF 10-03 may refer to the QoS limited backhaul indication received at the step 10-12 or the NGAP UE-TNLA binding associated with the UE 10-01 that made the request at the step 10-11. If the AMF 10-03 can immediately determine whether there is a possibility that a QoS limitation may occur in the user plane through the QoS limited backhaul indication received at the step 10-12 (e.g., (h) or (k)), step 10-14 to be described below may be omitted.

At step 10-14, the AMF 10-03 may determine whether different types of backhaul networks can be used in the control plane and the user plane, and based on this, determine whether a QoS limitation may occur in the user plane. When the AMF 10-03 determines that a QoS limitation may occur in the user plane, the following (n) and (o) may be included.

(n) When it was determined that a terrestrial backhaul network was used in the control plane at the step 10-13, and when it can be known that other types of backhaul networks can be used in the user plane through the QoS limited backhaul indication received at the step 10-12 (e.g., the case of (d))

(o) When it was determined that a satellite backhaul network was used in the control plane at the step 10-13, and when it can be known that other types of backhaul networks can be used in the user plane through the QoS limited backhaul indication received at the step 10-12 (e.g., the case of (l))

At step 10-15, according to the result determined at the steps 10-13 and 10-14, the AMF 10-03 may notify the SMF 10-05 that a QoS limitation may occur in the user plane (QoS limited backhaul indication). According to the result determined at the step 10-14, the AMF 10-03 may notify the SMF 10-05 that different types of backhaul networks can be used in the control plane and the user plane (CP-UP backhaul split indication).

At step 10-16, the SMF 10-05 and the PCF 10-06 may perform the SM policy association establishment procedure. The SMF 10-05 may deliver the QoS limited backhaul indication and the CP-UP backhaul split indication received from the AMF 10-03 at the step 10-15 to the PCF 10-06, and help the PCF 10-06 determine the pcc rule. When determining the AN PDB, the SMF 10-05 or the PCF 10-06 may refer to the QoS limited backhaul indication and the CP-UP backhaul split indication.

At step 10-17, the SMF 10-05 performs the UPF selection procedure. The SMF 10-05 may refer to the QoS limited backhaul indication and the CP-UP backhaul split indication received from the AMF 10-03 at the step 10-15.

At step 10-18, the SMF 10-05 and the UPF 10-04 may allocate CN tunnel info or network instance for user plane data traffic transmission. In this case, the QoS limited backhaul indication and the CP-UP backhaul split indication received from the AMF 10-03 at the step 10-15 may be referred to. The SMF 10-05 or the UPF 10-04 may determine to allocate an IP address, a port number, etc. in a specific range for each type of backhaul network.

At step 10-19, the SMF 10-05 may deliver the CN tunnel info or network instance allocated at the step 10-18 to the AMF 10-03.

At step 10-20, the AMF 10-03 may deliver the information received at the step 10-19 to the RAN 10-02.

At step 10-21, the RAN 10-02 may establish a user plane connection based on the information received at the step 10-20. When performing AN tunnel info allocation, the RAN 10-02 may refer to the result of determining at the step 10-12 that a QoS limitation may occur in the user plane. The RAN 10-02 may determine to allocate an IP address, a port number, etc. in a specific range for each type of backhaul network.

At step 10-22, the RAN 10-02 may deliver the AN tunnel info allocated at the step 10-21 to the AMF.

At step 10-23, the 3GPP 5G system may perform the remaining PDU session establishment procedure.

Figure 11:
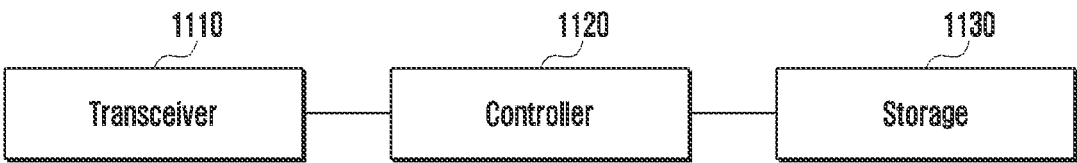
FIG. 11 is a diagram illustrating the structure of a UE according to an embodiment of the disclosure.

FIG. 11 is a diagram illustrating the structure of a UE according to an embodiment of the disclosure.

With reference to FIG. 11, the UE may include a transceiver 1110, a controller 1120, and a storage 1130. In the disclosure, the controller 1120 may be defined as a circuit or application-specific integrated circuit or at least one processor.

The transceiver 1110 may transmit/receive a signal to/from another network entity. The transceiver 1110 may receive, for example, system information from a base station, and may receive a synchronization signal or a reference signal. The transceiver 1110 may also transmit and receive the above-described messages.

The controller 1120 may control the overall operations of the UE according to the embodiments proposed in the disclosure. For example, the controller 1120 may control the signal flow between blocks to perform the operations of the UE in the signal flowchart described above. Specifically, the controller 1120 may control the operations proposed in the disclosure to manage a session in consideration of backhaul information in a wireless communication system according to an embodiment of the disclosure.

The storage 1130 may store at least one of information transmitted and received through the transceiver 1110 and information generated through the controller 1120.

Figure 12:
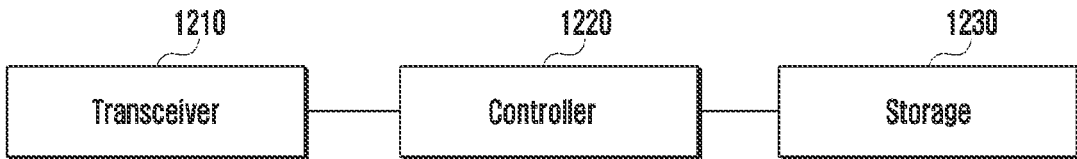
FIG. 12 is a diagram illustrating the structure of a base station according to an embodiment of the disclosure.

FIG. 12 is a diagram illustrating the structure of a base station according to an embodiment of the disclosure.

With reference to FIG. 12, the base station may include a transceiver 1210, a controller 1220, and a storage 1230. In the disclosure, the controller 1220 may be defined as a circuit or application-specific integrated circuit or at least one processor.

The transceiver 1210 may transmit/receive a signal to/from another network entity. The transceiver 1210 may transmit, for example, system information to a UE, and may transmit a synchronization signal or a reference signal. In addition, the transceiver 1210 may transmit or receive a message to a specific entity of the network according to each method described above. Also, the transceiver 1210 may transmit and receive the above-described signals/messages to and from the UE.

The controller 1220 may control the overall operations of the base station according to the embodiments proposed in the disclosure. For example, the controller 1220 may control the signal flow between blocks to perform the operations of the base station (e.g., RAN or AN) in the signal flowchart described above. Specifically, the controller 1220 may control the operations proposed in the disclosure to manage a session in consideration of backhaul information in a wireless communication system according to an embodiment of the disclosure.

The storage 1230 may store at least one of information transmitted and received through the transceiver 1210 and information generated through the controller 1220.

Figure 13:
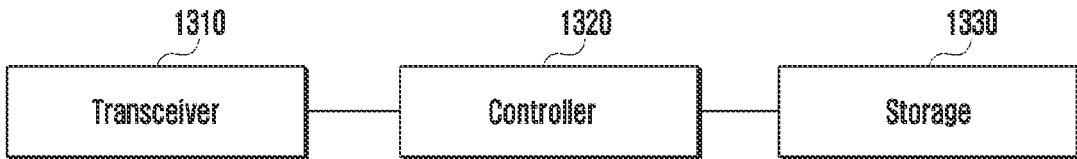
FIG. 13 is a diagram illustrating the structure of a network entity according to an embodiment of the disclosure.

FIG. 13 is a diagram illustrating the structure of a network entity according to an embodiment of the disclosure.

With reference to FIG. 13, the network entity may include a transceiver 1310, a controller 1320, and a storage 1330. In the disclosure, the controller 1320 may be defined as a circuit or application-specific integrated circuit or at least one processor.

The transceiver 1310 may transmit/receive a signal to/from another network entity or a base station. The transceiver 1310 may provide an interface for communicating with each network entity.

The controller 1320 may control the overall operations of the network entity according to the embodiments proposed in the disclosure. For example, the controller 1320 may control the signal flow between blocks to perform the operations of each network entity, for example, the operations of the AMF when the NF is the AMF or the operations of the SMF when the NF is the SMF, in the signal flowchart described above. Specifically, the controller 1320 may control the operations proposed in the disclosure to manage a session in consideration of backhaul information in a wireless communication system according to an embodiment of the disclosure. The storage 1330 may store at least one of information transmitted and received through the transceiver 1310 and information generated through the controller 1320.

INDUSTRIAL APPLICABILITY

The disclosure can be applied to the case of considering a backhaul network upon establishing a session between RAN and AMF and/or UPF in a wireless communication system.

The invention claimed is:

1. A session management method performed by an access network (AN) node of a wireless communication system using backhaul information, the method comprising:

selecting an access and mobility management function (AMF)upon receiving a registration request message from a user equipment (UE);

selecting one transport network layer association (TNLA) from candidate TNLAs for the selected AMF based on a type of a backhaul network of a control plane being associated to the TNLA;

transmitting an initial UE message to the selected AMF based on the selected TNLA; and performing a registration procedure of the UE in case that a selected TNLA response signal is received from the selected AMF, wherein the type of the backhaul network is at least one of low earth orbits (LEO) and a geosynchronous earth orbit (GEO).

2. The method of claim 1, further comprising:

before receiving the registration request message, setting up (NG setup) to provide information on radio interfaces with UEs located within radio coverage to connectible AMFs on a network.

3. The method of claim 2, wherein the setting up further comprises:

transmitting at least one of information including a global RAN node ID, supported tracking areas (TAs), broadcast PLMN list, and radio access technology (RAT) to the AMF.

4. The method of claim 1, further comprising:

modifying a NGAP UE-TNLA-binding based on a UE-TNLA-binding modification message being received from the selected AMF through a new TNLA; and performing a registration procedure of the UE based on the modified NGAP UE-TNLA-binding.

5. The method of claim 1, further comprising:

after transmitting the initial UE message to the selected AMF based on the selected TNLA, receiving a reroute NAS request message including an AMF set ID including at least two different AMFs from the selected AMF;

selecting a second AMF for session establishment from the AMFs included in the AMF set ID;

selecting a second TNLA from candidate TNLAs for the selected second AMF;

transmitting an initial UE message to the selected second AMF based on the selected second TNLA; and performing a registration procedure of the UE in case that a selected second TNLA response signal is received from the selected second AMF.

6. The method of claim 1, wherein one TNLA is selected from the candidate TNLAs based on a quality of service (QoS) limitation.

7. The method of claim 1, wherein one TNLA is selected from the candidate TNLAs using at least one of availability, weight factor, or backhaul network type.

8. The method of claim 7, wherein the backhaul network type further includes a terrestrial backhaul network.

9. An access network (AN)node device for managing a session using backhaul information in a wireless communication system, the device comprising:

a transceiver configured to communicate with a specific node of the wireless communication system and communicate with a user equipment (UE);

a memory configured to store session related instructions; and at least one processor configured to execute the session related instructions to cause the AN node device to:

select an access and mobility management function (AMF) upon receiving a registration request message from the UE through the transceiver, select one transport network layer association (TNLA) from candidate TNLAs for the selected AMF based on a type of a backhaul network of a control plane being associated to the TNLA, transmit an initial UE message to the selected AMF based on the selected TNLA through the transceiver, and perform a registration procedure of the UE in case that a selected TNLA response signal is received from the selected AMF, wherein the type of the backhaul network is at least one of low earth orbits (LEO) and a geosynchronous earth orbit (GEO).

10. The device of claim 9, wherein the at least one processor is further configured to execute the session related instructions to cause the AN node device to:

before receiving the registration request message, set up (NG setup) to provide information on radio interfaces with UEs located within radio coverage to connectible AMFs on a network.

11. The device of claim 10, wherein the at least one processor is further configured to execute the session related instructions to cause the AN node device to:

in the setup, transmit at least one of information including a global RAN node ID, supported tracking areas (TAs), broadcast PLMN list, and radio access technology (RAT) to the AMF via the transceiver.

12. The device of claim 9, wherein the at least one processor is further configured to execute the session related instructions to cause the AN node device to:

modify a NGAP UE-TNLA-binding based on a UE-TNLA-binding modification message being received from the selected AMF through a new TNLA; and perform a registration procedure of the UE based on the modified NGAP UE-TNLA-binding.

13. The device of claim 9, wherein the at least one processor is further configured to execute the session related instructions to cause the AN node device to:

after transmitting the initial UE message to the selected AMF through the transceiver based on the selected TNLA, receive a reroute NAS request message including an AMF set ID including at least two different AMFs from the selected AMF;

select a second AMF for session establishment from the AMFs included in the AMF set ID;

select a second TNLA from candidate TNLAs for the selected second AMF;

transmit an initial UE message to the selected second AMF via the transceiver based on the selected second TNLA; and perform a registration procedure of the UE in case that a selected second TNLA response signal is received from the selected second AMF.

14. The device of claim 9, wherein the at least one processor is further configured to execute the session related instructions to cause the AN node device to:

select one TNLA from the candidate TNLAs, based on a quality of service (QoS)limitation.

15. The device of claim 9, wherein the at least one processor is further configured to execute the session related instructions to cause the AN node device to:

select one TNLA from the candidate TNLAs based on at least one of availability, weight factor, or backhaul network type, and wherein the backhaul network type further includes a terrestrial backhaul network.

* * * * *